Figure 1:
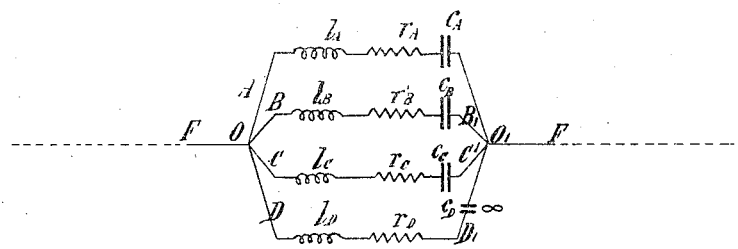

G. CAMPOS.
MEANS FOR THE PROTECTION OF ELECTRICAL INSTALLATIONS FROM EXCESS VOLTAGES.
APPLICATION FILED AUG. 12, 1910.

1,034,197.

Patented July 30, 1912.

Witnesses:

Inventor
Gino Campos
By
James L. Norris, Jr.
Atty

UNITED STATES PATENT OFFICE.

GINO CAMPOS, OF MILAN, ITALY.

MEANS FOR THE PROTECTION OF ELECTRICAL INSTALLATIONS FROM EXCESS VOLTAGES.

1,034,197.

Specification of Letters Patent.    Patented July 30, 1912.

Application filed August 12, 1910. Serial No. 576,864.

*To all whom it may concern:*

Be it known that I, GINO CAMPOS, electrical engineer, subject of the Emperor of Austria-Hungary, residing at Milan, Italy, have invented certain new and useful Improvements in Means for the Protection of Electrical Installations from Excess Voltages, of which the following is a specification.

The present invention has for its object the protection of electrical installations from excess voltages which arise owing to sudden alterations of the electrical conditions in the conductors, or which may result from alternating currents and oscillatory currents of high periodicity and also from electrical wave-fronts which propagate themselves quickly along the conductor. All these phenomena may have their origin either inside or outside the installation and be caused for example by atmospheric discharges, by resonances between the various parts of the installation, in normal operation or by accidentally arising phenomena in the installation itself.

The object of the present invention is to prevent the propagation of these excess voltages along the conductors or electric lines by damping their amplitude upon their path by means of a device inserted in series on the said line, which notably increases the "effective" or "equivalent" resistance and consequently increases the loss of energy for alternating currents of high frequency that it is desired to damp without thereby appreciably impeding the passage of the normal working currents of the line.

Another object in conjunction with these properties is that no part of the device is located in shunt either between conductors of the line or between conductors themselves and the earth, so that it may be employed on lines working with a very high tension without any strong insulation between their several parts and without danger of short-circuiting or of losses between the line wires.

In accordance with the present invention these objects are attained by employing two or more electric circuits in parallel one with the other and inserted in series with the considered conductor. Each of these circuits comprises electric resistances inductances and capacities or only one or some of these magnitudes so that the "equivalent ohmic resistances" produced by these circuits as a whole increases, together with the frequency of the variable currents produced by the electrical excess voltages and consequently the loss of energy and the damping of the said currents increase. One of these arrangements which consists of four lengths of conductor OAA′O′, OBB′O′, OCC′O′, ODD′O′ arranged in parallel one with the other and in series with the line wire is illustrated by way of example in Figure 1 where:—$r_A$, $l_A$, $c_A$ for the length OAA′O′, $r_B$ $l_B$ $c_B$ for the length OBB′O′, $r_C$ $l_C$ $c_C$ for the length OCC′O′, $r_D$ $l_D$ $c_D$ for the length ODD′O′, represent the ohmic resistance, the inductance and the capacity.

At least one of the lengths (ODD′O′ in Fig. 1 for example) should have an infinite capacity, that is to say it must be a continuous conductor in order to present no impediment to the passage of the working currents of the line. If all the lengths are continuously conducting, that is to say when only the ohmic resistance $r$ and the inductance $l$ have to be considered, the system composed of these different lengths connected together in parallel is equivalent to a single conductor (the mathematical demonstration is a known one) which presents an equivalent ohmic resistance $$R=\frac{\sum\frac{r}{r^2+\omega^2 l^2}}{\left(\sum\frac{r}{r^2+\omega^2 l^2}\right)^2+\left(\sum\frac{\omega l}{r^2+\omega^2 l^2}\right)^2}$$

variable with the frequency $$\frac{\omega}{2\pi},$$

and an inductance (effective inductance):

$$L=\frac{\sum\frac{\omega l}{r^2+\omega^2 l^2}}{\left(\sum\frac{r}{r^2+\omega^2 l^2}\right)^2+\left(\sum\frac{\omega l}{r^2+\omega^2 l^2}\right)^2}$$

variable with the frequency in like manner.

Figure 2:
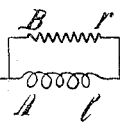

In Fig. 2 a special case which is frequently adequate is illustrated, that is to say a system consisting of only two circuits connected in parallel one with the other and in series with the line and in which one of the circuits A comprises the self-induction $l$ together with a negligible resistance, while the other circuit B comprises an exclusively ohmic resistance $r$. In this case the employment of the above formulas with only two lengths connected in parallel and taking into account the hypotheses adopted for the latter gives the value $$R = \frac{r}{1+\left(\frac{r}{\omega l}\right)^2}$$

for the equivalent resistance and $$L = \frac{l}{1+\left(\frac{\omega l}{r}\right)^2}$$

for the equivalent inductance. From these equations it will be seen that with the increase of the frequency, and consequently of $\omega$ the effective resistance R increases to the maximum value $r$ while the effective inductance L decreases more and more. For example if $l = 0.0005$ henry and $r = 100$ ohm we get:

For $\omega = 2\pi \times 50$ R = 0.000245 ohm, L = 0.0005 henry

For $\omega = 2\pi \times 50000$ R = 71 ohm, L = 0.000145 henry

By suitably selecting the values of $l$ and $r$ according to each particular case it is possible to provide a system which possesses only a small inductance and a very small ohmic resistance for the low frequencies (then also for the normal frequencies if normally operated by alternating current), while for the higher frequencies caused by the electrical excess voltages or the sudden alterations in the electrical condition of the conductors it receives a considerably greater equivalent resistance and consequently produces a much greater loss of energy or damping of the electrical oscillations or alternations propagating themselves along the conductor. As simultaneously owing to this arrangement as a whole the value of the "equivalent inductance" diminishes at high frequencies, the value of the reflection of the electric waves or disturbances (which reflection may cause interferences and increases of voltage) is relatively diminished. Consequently the storing of electromagnetic energy which might assist the propagation of the excess voltages in opposition to the action of the ohmic resistance is rendered more difficult.

In connection with what has been stated above it should be noted that the values of $r$ and $l$ should not be regarded as absolutely constant magnitudes as in the case of high frequencies especially owing to the known phenomenon of superficial flow or "skin effect" they may vary considerably.

By suitably selecting the value when negligible values are ascribed to the ohmic resistance of A or to the inductance B or to both of them, a similar result to that of the present case can be obtained. The latter is also attainable when several circuits are connected in parallel instead of two, or when limited capacities as in Fig. 1 are inserted in some of them. Similarly it is possible to reach a zone of maximum effect which applies to frequencies that are comprised between given limit values.

Figure 3:
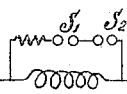

The ohmic resistance of the circuit B in Fig. 2 or some of the circuits connected in parallel in Fig. 1 may comprise the resistance of one or more sparks when the conductor is supposed to be broken up into one or more spark gaps; in which case the arrangement of Fig. 2 containing only two circuits in parallel turns up into the example of Fig. 3, where two sparking gaps $-s-$ and $-s^2$ are shown and where the ohmic resistance of the metallic lengths connected in series with the latter may be very small, and where the capacity of the conductor in question must be considered as possessing a limited value.

As appears from what has been stated, the arrangement described comprises no part in shunt either among the various wires or conductors of the line or among these and the earth; in point of fact only a single wire has been shown in each figure with the device connected thereto. Consequently it is absolutely impossible with the said arrangements, even if faults should arise in the device, for short circuiting among the line wires or with the earth to take place. In addition to this, the system which on the one hand meets the requirement of the free passage of the normal working current, and on the other hand dissipates the energy of the currents with high frequency and effectively damps them in their path, does not interpose in the circuit or in the electric line any element which would be prejudicial for efficient working or would reduce the security thereof.

What I claim and desire to secure by Letters Patent of the United States is:—

Means for protecting electrical installations from excess voltages, consisting of electric circuits connected to each other in parallel and each comprising ohmic resistance, conducting means on which said circuits are mounted in series, and means for increasing the equivalent ohmic resistance produced by the said circuits as a whole whereby the equivalent resistance of the system composed of the said circuits increases with the increase of the frequency of the variable currents arising from the electrical excess voltages and consequently the loss of energy and the damping of the same currents along their path increase without opposing any appreciable impediment to the passage of the normal working currents of the installation.

In testimony whereof I affix my signature in presence of two witnesses.

GINO CAMPOS.

Witnesses:
ENRICO VERONELLY,
CHAS. H. LUSCHER.